United States Patent [19]

Dobson et al.

[11] Patent Number: 5,753,192

[45] Date of Patent: May 19, 1998

[54] ZIRCONIA AND SULFATE IN NOX TRAPS TO IMPROVED TRAPPING AND SULFUR TOLERANCE

[75] Inventors: Douglas A. Dobson, Plymouth; Carolyn Parks Hubbard, Dearborn Heights, both of Mich.; William Lewis Henderson Watkins, Toledo, Ohio

[73] Assignee: Ford Global Technologies, Inc., Dearborn, Mich.

[21] Appl. No.: 753,753

[22] Filed: Nov. 29, 1996

[51] Int. Cl.⁶ .................................................. B01D 53/34
[52] U.S. Cl. ..................... 422/177; 422/171; 60/297; 502/439; 502/217; 502/328; 502/339
[58] Field of Search ......................... 422/171, 177, 422/180, 211; 502/439, 527, 327, 351, 349, 217, 328, 339; 60/297, 301, 274

[56] References Cited

U.S. PATENT DOCUMENTS 4,771,028  9/1988  Arai et al. ................................. 502/439
5,402,641  4/1995  Katoh et al. .............................. 60/285
5,472,673  12/1995  Goto et al. ............................... 422/171

*Primary Examiner*—Hien Tran
*Attorney, Agent, or Firm*—Lorraine S. Melotik

[57] ABSTRACT

The invention is a nitrogen oxide trap comprising a porous support loaded with 6–15 wt. % strontium oxide and thereon, a mixture of: 0.5–5 wt. % precious metal catalyst selected from platinum, palladium, rhodium or mixtures thereof loaded, 3.5–15 wt. % zirconium and 15–30 wt. % sulfate, where preferably the ratio of zirconium to sulfate ranges from about 1:1 to 1:7; each wt. % being individually based on the weight of the support. The trap may be used in an internal combustion engine exhaust gas catalyst system. During lean-burn operation of the engine the trap sorbs nitrogen oxides (NOx) and releases the nitrogen oxides during decreased oxygen concentration in the exhaust gas, the desorbed NOx being converted to $N_2$ and $O_2$.

13 Claims, 2 Drawing Sheets

5,753,192

ZIRCONIA AND SULFATE IN NOX TRAPS TO IMPROVED TRAPPING AND SULFUR TOLERANCE

FIELD OF THE INVENTION

This invention relates to nitrogen oxide traps employed in the exhaust system of an internal combustion engine to absorb nitrogen oxides during lean-burn operation.

BACKGROUND OF THE INVENTION

Catalysts are employed in the exhaust systems of automotive vehicles to convert carbon monoxide, hydrocarbons, and nitrogen oxides ($NO_x$) produced during engine operation into more desirable gases. When the engine is operated in a stoichiometric or slightly rich air/fuel ratio, i.e., between about 14.7 and 14.4, catalysts containing palladium, platinum and rhodium, or palladium and rhodium are able to efficiently convert all three gases simultaneously. Hence, such catalysts are often called "three-way" catalysts. It is desirable to operate the engine under "lean-burn" conditions where the A/F ratio is greater than 14.7, generally between 19 and 27, to realize a benefit in fuel economy. Such three-way catalysts are able to convert carbon monoxide and hydrocarbons but are not efficient in the reduction of $NO_x$ during lean-burn (excess oxygen) operation.

One approach for treating $NO_x$ in exhausts from lean-burn engines which is currently receiving considerable attention involves the use of so-called $NO_X$ traps which generally include platinum and an alkali or alkaline earth metal. As disclosed in U.S. Pat. No. 5,402,641 to Katoh et al, the widely held mechanism for this adsorption phenomena is that the platinum first oxidizes NO to $NO_2$ and the $NO_2$ subsequently forms a nitrate complex with the other material, e.g., potassium or strontium. In a stoichiometric or rich environment, the nitrate is thermodynamically unstable, and the stored $NO_x$ is released. $NO_x$ then catalytically reacts with reducing species in the exhaust gas to form $N_2$. Generally, NOx traps are prepared by impregnating both the platinum and the other material like potassium onto a porous carrier, e.g., alumina.

While such NOx traps possessed adequate trapping efficiency, they had the serious drawback that they are very susceptible to sulfur poisoning. Most fuels for automotive vehicles contain sulfur and when burnt, the sulfur is converted to sulfur compounds like $So_2$. Over time, the sulfur compounds react with trap materials like potassium forming sulfates which will not revert back to the sorption material. These sulfates are inactive for NOx sorption. As a result, the typical NOx trap is strongly deactivated by fuel sulfur. We have unexpectedly found that a novel composition for NOx traps which displays both enhanced NOx sorption efficiency and resistance to sulfur poisoning.

DISCLOSURE OF THE INVENTION

This invention is directed to a nitrogen oxide ($NO_x$) trap useful to trap nitrogen oxides during the lean-burn operation of an internal combustion engine. The NOx trap comprises: a porous support first loaded with 6–15 wt. % strontium oxide and then loaded with: (a) 0.5–5 wt. % precious metal selected from platinum, palladium, rhodium or mixtures thereof; (b) 3.5–15 wt. % zirconium; and (c) 15–30 wt. % sulfate;, the components (a), (b) and (c) being loaded together onto the strontium oxide loaded support, all weight percents being individually based on the weight of the support. Preferably, the ratio of zirconium to sulfate is between about 1:1 to 1:7. One convenient way to load the precious metal, zirconium and sulfate together onto the strontium oxide loaded support is from a soluble mixture of their precursors. According to another aspect of the invention, it comprises a process for making the NOx trap disclosed above, an internal combustion engine exhaust gas catalyst system comprising the disclosed NOx trap.

The engine may be a gasoline engine or a diesel engine. The trap is arranged in the exhaust system and absorbs $NO_x$ when the air/fuel ratio of exhaust gas flowing into said trap is lean and releases the absorbed $NO_x$ when the oxygen concentration in the exhaust gas is lowered, as during stoichiometric or rich operation of the engine. According to another aspect of the invention is a process for trapping nitrogen oxides using the disclosed traps.

Advantageously, we have found that including zirconia in the present invention formulation with strontium oxide and precious metal, in a particular method of manufacture, significantly increases the NOx absorption efficiency. Moreover, addition of sulfate to the above disclosed formulation further enhances the NOx absorption efficiency, and, more importantly, the resistance of the NOx adsorbing material to sulfur. That is, we believe that this allows the strontium oxide to remain available to sorb NOx and that it is much less susceptible to sulfur poisoning than in conventional NOx traps where strontium and precious metal like platinum are only employed.

DESCRIPTION OF PREFERRED EMBODIMENTS

Figure 1:
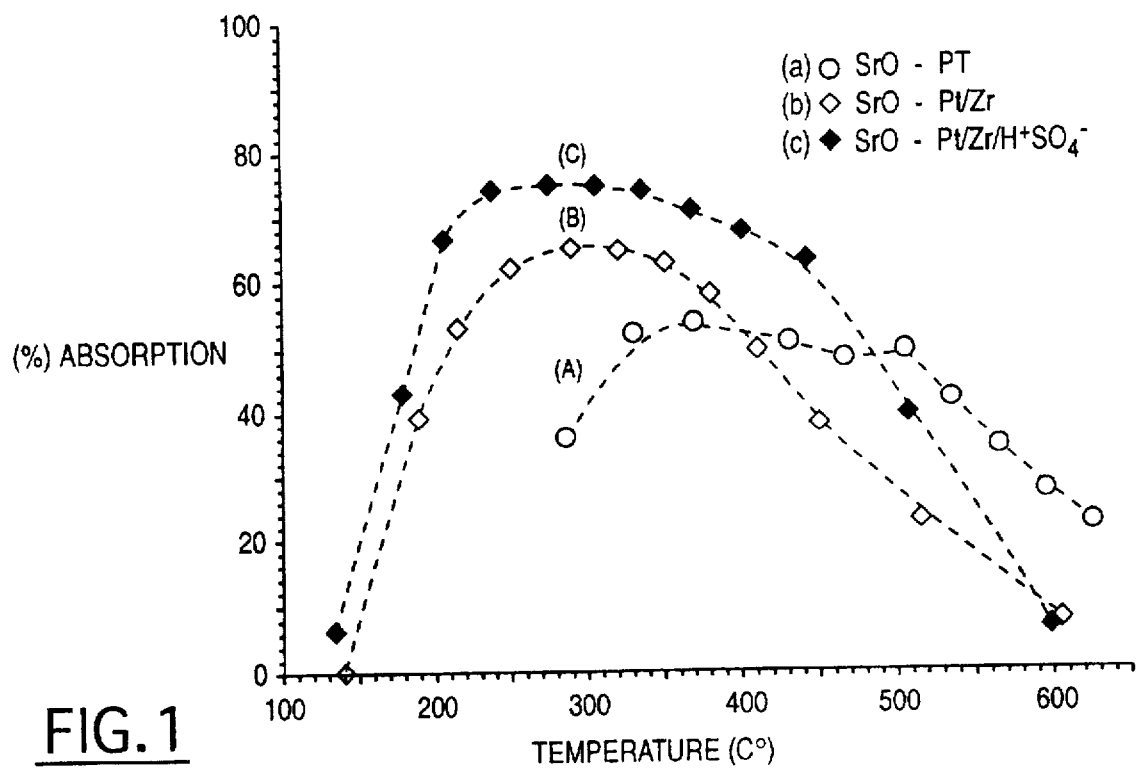
FIG. 1 is a graph showing the effect of zirconia and sulfate on the NOx sorption efficiency, (a) being a comparative NOx trap while (b) and (c) are embodiments of the present invention.

This invention, according to one aspect, is directed to an internal combustion engine exhaust gas catalyst system comprising a nitrogen oxide trap. The $NO_x$ trap comprises a porous support impregnated with various materials, in a particular order. That is, the support must first be loaded with strontium in its oxide form, as by providing a strontium compound which is then converted to its oxide by calcination in oxygen. Thereafter, this support is provided with : precious metal, zirconium and sulfate. Further detail is provided in the following discussion.

The preferred (and most preferred being in parenthesis) weight percent ranges for each of these materials based on the weight of the support material are as follows: strontium oxide 9–15 wt. % (10–13 wt. %); precious metals 0.8–3.5 wt. % (1.5–2.5 wt. %); zirconium 3.5–11 wt. % (6–9 wt. %); and acidic sulfate 18–27 wt. % (20.5–25 wt. %). The zirconium to sulfate weight ratio (i.e., the ratio of the weights of each of these materials) can range from about 1:1 to 1:7, with the most preferred ratio at about 1:3. The precious metals may be a mixture of precious metals. Optimally, if a mixture of precious metals is employed, it comprises platinum and rhodium most preferably in a weight ratio of about 5:1.

The porous support (washcoat) material loaded with the catalysts is preferably a high surface area washcoat material like alumina, preferably being at least 50 wt. % gamma-alumina. Most preferably, it is 100% gamma-alumina. Still other washcoat materials which may be used at the high operation temperatures associated with an internal combustion engine exhaust system include, but are not limited to, zeolite, ceria, and zirconia. Such washcoat materials, useful for carrying catalyst materials, are well known to those skilled in the art. The choice of the particular porous support (washcoat) material is not critical to this invention. Desirably, the support material has a surface area between about 5 and 300 m²/g.

For useful application in an exhaust gas system for example gasoline or diesel engines, the washcoat will be carried on a substrate of a high temperature stable, electrically insulating material. Typical of such substrate materials are cordierite, mullite, etc. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

The support material like alumina may be applied to the substrate first and then the other materials loaded thereon or the materials may be loaded on the support material and then this product loaded on a substrate, in a manner which would be readily apparent to those skilled in the art of catalyst manufacture. Preferably, the support material (washcoat) is first applied to the substrate as a slurry which is then dried and calcined. Then the strontium oxide is provided on the support, and subsequently the precious metal, zirconium, and sulfate are provided together, preferably from a mixture of their soluble salts, onto the strontium oxide/support. As seen from Example 1 and FIG. 2, the zirconium must be provided onto the strontium oxide/support only in mixture along with the precious metal and sulfate and not separately onto the support in order to provided the unexpected properties of the present invention. That is, as is shown from the figures, the zirconium must be kept separate from the strontium oxide phase to achieve the unexpected NOx sorption improvement and sulfur tolerance of the present invention.

One method useful to conveniently provide the strontium oxide on the support involves impregnating the support, e.g., alumina, with a solution of a soluble salt of strontium, e.g., a salt like strontium nitrate in an aqueous or organic solvent solution. Examples of other soluble precursors for strontium include, but are not limited to, strontium chloride and strontium carbonate. After impregnating with the strontium oxide precursor, the support is generally dried at about 90° C. for several hours and then calcined at about 550° C. for several hours. Drying and calcination of the impregnated strontium oxide precursor material in the presence of oxygen (e.g., air) converts the precursor to its oxide. It was found critical to this invention that the strontium on the support be converted to strontium oxide before the mixture of the other materials is loaded onto the support. The particular parameters of the drying and calcination steps are not critical to the invention and selection of optimal times and temperatures would be within the skill of those in the art in view of the disclosure.

Figure 3:
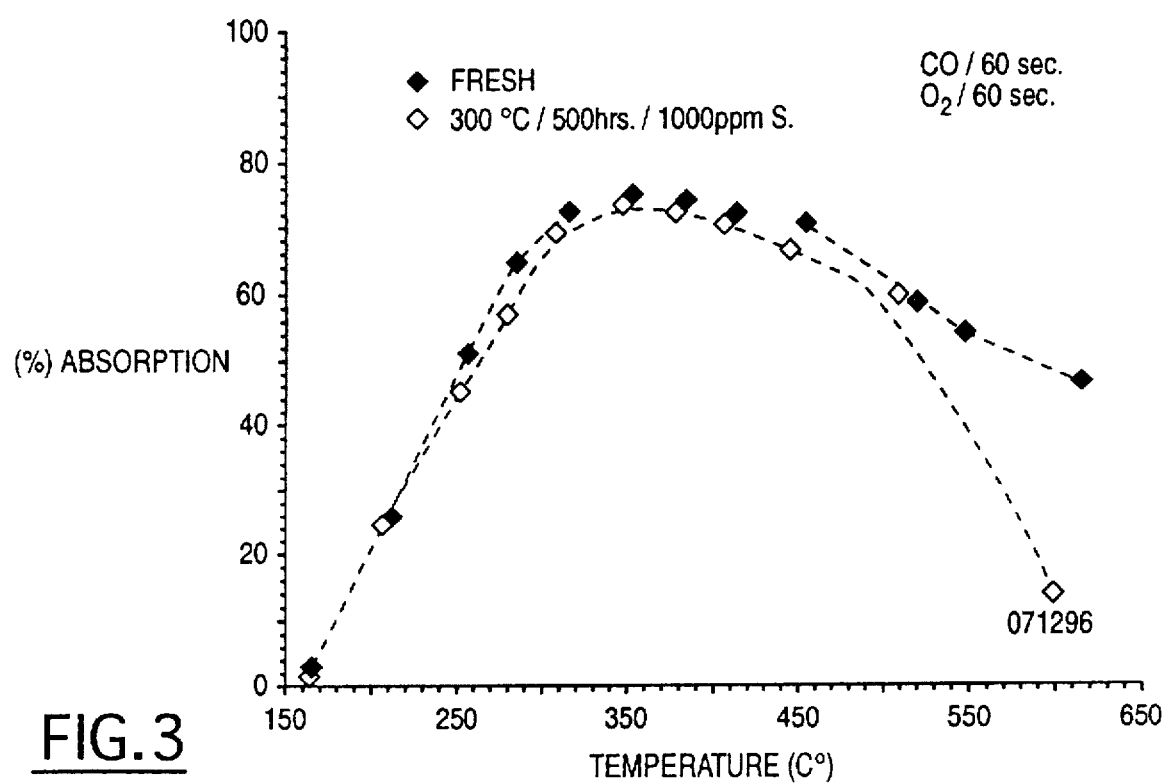
FIG. 3 is a temperature profile graph showing the effect of exposure to sulfur of a NOx trap material according to an embodiment of the present invention.

The other materials, i.e., precious metals, zirconium and sulfate can then be deposited on the strontium oxide/support, as by the impregnation techniques described above and well known to those skilled in the art. According to such techniques, a mixture of the precursors of zirconium, precious metal, and sulfate is impregnated onto the strontium oxide/support after which drying and calcination takes place. Calcination is heating at elevated temperatures generally in the presence of oxygen. The zirconium and sulfate are expected to be present mostly as zirconium sulfate since sulfate reacts with the zirconium. Sulfate is significantly more chemically reactive with zirconium ions in the solution than it is with the aluminum of calcined alumina. Hence, at most a very small amount of the sulfate may react with aluminum to form aluminum sulfate. In like manner, strontium exists as calcined strontium oxide and is present in a much smaller amount compared to alumina, and thus little or no reaction between strontium and sulfate is expected. Evidence of this is confirmed by FIG. 3 where essentially no loss in NOx sorption efficiency is observed after 500 hours of exposure to a simulated exhaust stream containing sulfur dioxide. The strontium oxide is known to be the component which sorbs the NOx.

Examples of soluble precursors for precious metals include, but are not limited to, dihydrogen hexachloroplatinate, ammonium chloroplatinate, and platinum chloride. Examples of soluble precursors for zirconium include, but are not limited to, zirconium chloride, zirconium nitrate, and zirconium carbonate. The acidic sulfate precursor, includes but is not limited to, sulfuric acid, sulfur dioxide (gas) and sulfuryl chloride. The particular precursor salt employed as well as the solvent is not critical to this invention. Other precursor materials which may be used would be apparent to those skilled in the art in view of the present disclosure.

According to the invention, these materials are loaded on the support in particular amounts, detailed above. The inclusion of sulfate along with the zirconium in the precursor mixture applied to the strontium oxide/support so that zirconium sulfate can be formed is critical to the invention. We have found that the zirconium sulfate further enhances the NOx trap sorption efficiency and most critically, enhances the resistance of the strontium oxide of the trap material to sulfur poisoning.

The internal combustion engine catalyst system of this invention may include another catalyst device as, for example, a catalytic converter employing a conventional three-way catalyst containing palladium, etc. The three-way catalyst can be placed upstream of the $NO_x$ trap, hence closer to the engine. In such an arrangement, the three-way catalyst being closely mounted to the engine would warm up quickly and provide for efficient engine cold start emission control. Once the engine is warmed up, the three-way catalyst will remove hydrocarbons, carbon monoxide, and nitrogen oxides from the exhaust during stoichiometric operation and hydrocarbons and carbon monoxide during lean operation.

The $NO_x$ trap would be positioned downstream of the three-way catalyst where the exhaust gas temperature enables maximum $NO_x$ trap efficiency. Also, with the $NO_x$ trap positioned downstream of the three-way catalyst in a remote location, it is protected against very high exhaust gas temperatures which could damage it. During periods of lean-burn engine operation when $NO_x$ passes through the three-way catalyst, $NO_x$ is stored on the trap. The $NO_x$ trap is periodically regenerated by short periods or intervals of slightly rich engine operation. The stored $NO_x$ is then released from the alkali metal trapping material and is catalytically reduced over the platinum by the excess CO, $H_2$ and HCs present in the exhaust. However, one may wish to place a second three way catalyst downstream of the $NO_x$ trap in order to further aid in this regard.

This invention catalyst has particular utility when used with lean-burn engines. Lean-burn engines are those which at least during part of their operation operate with air/fuel ratios containing excess oxygen relative to the stoichiometric ratio. For gasoline engines that range is usually 19–27 and for diesel the range is usually 19–40. As shown by means of the following examples and the figures herein, the use of the strontium oxide, precious metal, zirconium and acidic sulfate particularly in this relationship of contact to one another provides the superior resistance to sulfur poisoning and enhanced NOx absorption. While not wishing to be bound by theory, it is believed that this superiority is due to an increase in NOx adsorption-site density resulting from the interactions between platinum, alumina, zirconia and acidic sulfate. In particular, it is believed that the resistance to sulfur poisoning of the invention trap material is the result of the specific NOx trap preparation method. That is, this preparation, with strontium oxide prepared first and the precious metal, zirconium and acidic sulfate added onto the strontium oxide formulation later, we believe favors the formation of stable zirconium and aluminum sulfates. Hence, further sulfation of the trap from sulfur, which may be present in the exhaust gas, will not be thermodynamically favorable. This, we believe, allows the strontium oxide to remain available to act as the NOx trapping material. Thus, this formulation enhances rather than deactivates the NOx sorption efficiency. Neither the validity nor understanding of this theory is however necessary for the practice of this invention. We did clearly find, however, that no significant loss of NOx trapping efficiency with the invention traps was observed when exposed to sulfur. This was unexpected since prior art NOx trap formulations including only precious metal and materials like potassium or strontium were very susceptible to poisoning by sulfur.

EXAMPLE 1

A nitrogen oxide trap according to an embodiment of the present invention is prepared as follows. Gamma-alumina (100m$^2$/g) is ball milled and mixed with distilled water to produce a slurry. The slurry is applied to a cordierite monolith (400 cells/in$^2$) to obtain a 30 wt % loading of the alumina. The monolith is subsequently dried at 120° C. to remove the water and calcined in air at 500° C. for 6 hours.

The alumina-coated monolith is first impregnated with an aqueous solution containing strontium nitrate adjusted so as to provide 12 wt % strontium oxide on the alumina washcoat. Following impregnation with the solution, the alumina is dried at 90° C. for 5 hours to remove the water and then calcined at 550° C. for 5 hours which converts the strontium to strontium oxide. The strontium oxide/alumina washcoat is then impregnated with an aqueous solution containing three materials: dihydrogen hexachloroplatinate, zirconium chloride, and sulfuric acid (adjusted so as to provide 1 wt % Pt/7 wt % Zr/23 wt % sulfate on this washcoat). The subsequent NOx trap is then oven dried and calcined as above. The NOx sorption efficiency of the invention embodiment (FIG. 1(c)) is seen to be significantly increased over that of the FIG. 1 comparative traps (a) and (b) made as described in Example 2 below.

In order to test the $NO_x$ sorption efficiency of the invention trap embodiment made above when subjected to $SO_2$, the strontium oxide/platinum/zirconium/acidic sulfate trap was subjected to a simulated exhaust gas containing: 1000 ppm NO, 10% $CO_2$, 10% $H_2O$, 0.1% CO, 0.03% $H_2$, 50 ppm $C_3H_6$, 20 ppm $SO_2$ and 6% $O_2$. The total exhaust gas flow rate was 3 liter/min and the space velocity was 20,000 hr$^{-1}$. It can be seen from FIG. 3 that essentially no loss of NOx trapping efficiency is observed after 500 hours of exposure to this simulated exhaust stream. This was unexpected since, as discussed above, earlier generation NOx traps became severely deactivated after exposure to sulfur.

EXAMPLE 2

Figure 2:
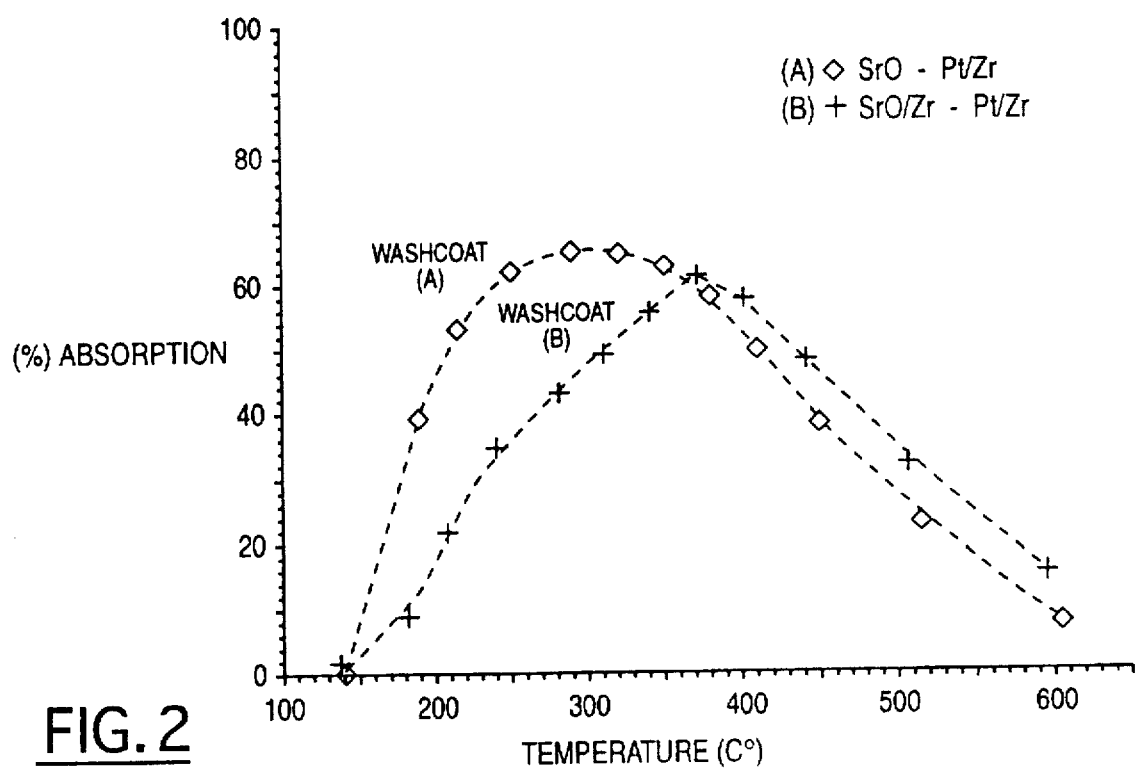
FIG. 2 is a graph showing the effect of zirconia placement on NOx sorption efficiency, (b) being a comparative example not according to the present invention.

Three other NOx trap formulations were made generally following the procedure described in Example 1, except that they are comparative examples (not according to the present invention). In each case, strontium oxide/alumina was made as in Example 1. In the first formulation, the strontium oxide/alumina washcoat is impregnated with a solution containing dihydrogen hexachloroplatinate (adjusted so as to provide 1 wt % Pt on this washcoat). In the second case, the strontium oxide/alumina washcoat is impregnated with a solution containing a mixture of dihydrogen hexachloroplatinate and zirconium chloride (adjusted so as to provide 1 wt % Pt/7 wt % Zr on this washcoat). These two nitrogen oxide traps were dried and calcined as described above. Finally, in a third case a washcoat is prepared in which the strontium oxide/alumina washcoat is impregnated with a solution containing only zirconium chloride (adjusted so as to provide 3.5 wt % Zr on the washcoat), dried and calcined as described above. This strontium oxide/zirconium/alumina washcoat is then impregnated with a solution containing dihydrogen hexachloroplatinate and zirconium chloride (adjusted so as to provide 1 wt % Pt/3.5 wt % Zr on this washcoat), dried and calcined as described above. The NOx trapping efficiencies of these comparative NOx traps are shown in FIGS. 1 and 2. In particular, the NOx absorption for the first comparative formulation is shown in FIG. 1(a) and that of the second comparative is shown in FIG. 1(b), while the third formulation is shown in FIG. 2(A). As discussed in Example 1, from FIG. 1 is can be seen that the NOx sorption, within the desired application temperature range of about 250°–400°, significantly increases in the present invention embodiment trap which includes zirconium, platinum, sulfate. From FIG. 2 is can be seen that placement of the zirconium separate from the strontium oxide is necessary to the present invention.

EXAMPLE 3

An alumina-coated monolith is prepared according to the previous example and impregnated with an aqueous solution containing strontium nitrate adjusted so as to provide for 6 wt. % strontium oxide on the alumina washcoat. Following impregnation, the monolith is dried at 90° C. for 5 hours and then calcined at 550° C. for 5 hours. The resulting product is then impregnated with an aqueous solution containing dihydrogen hexachloroplatinate, zirconium chloride and sulfuric acid, dried, and calcined as above. The concentration of dihydrogen hexachloroplatinate, zirconium chloride, and sulfuric acid are adjusted so as to provide for 1 wt % Pt, 7 wt % Zr and 23 wt % sulfate on the strontium oxide/alumina washcoat. Exposure of the present invention embodiment trap to a simulated exhaust gas containing sulfur shows that the $NO_x$ is efficiently trapped by the catalyst and most importantly, this NOx trap formulation provides excellent resistance to sulfur poisoning.

EXAMPLE 4

An alumina coated monolith is prepared according to the previous example and impregnated with an aqueous solution containing strontium nitrate adjusted so as to provide for 12 wt % strontium oxide on the alumina washcoat. Following impregnation, the monolith was dried at 90° C. for 5 hours and then calcined at 550° C. for 5 hours. The resulting product is then impregnated with an aqueous solution containing dihydrogen hexachloroplatinate and zirconium chloride; the concentration of dihydrogen hexachloroplatinate and zirconium chloride are adjusted so as to provide 1.0 wt % of platinum and 11 wt. % zirconium on the strontium oxide/alumina washcoat. The monolith is then dried and calcined as before. Although this is a comparative example not according to the present invention, the use of zirconium with the platinum is shown to increase the $NO_x$ trapping efficiency of the catalyst.

EXAMPLE 5

An alumina coated monolith is prepared according to the previous example and impregnated with an aqueous solution containing strontium nitrate adjusted so as to provide for 12 wt. % strontium oxide on the alumina washcoat. Following impregnation, the monolith is dried at 90° C. for 5 hours and then calcined at 550° C. for five hours. The resulting product is then impregnated with an aqueous solution containing dihydrogen hexachloroplatinate, zirconium chloride and sulfuric acid. The concentration of dihydrogen hexachloroplatinate, zirconium chloride, and sulfuric acid are adjusted so as to provide for 1 wt. % Pt, 7 wt % Zr and 10% sulfate on the strontium oxide/alumina washcoat. The monolith is then dried and calcined as above. Testing in a simulated exhaust gas containing sulfur shows that the NOx is efficiently trapped by the present invention embodiment NOx catalyst. More importantly, this NOx trap formulation displays excellent resistance to sulfur poisoning.

EXAMPLE 6

An alumina coated monolith is prepared according to the previous example and impregnated with an aqueous solution containing strontium nitrate adjusted as to provide 12 wt % strontium oxide on the alumina washcoat. Following impregnation the washcoat is dried and calcined as described above. The strontium oxide/alumina washcoat is then impregnated with a solution containing dihydrogen hexachloroplatinate and zirconium chloride; the concentrations are adjusted so as to provide for 4 wt. % platinum and 7 wt % Zr on the strontium oxide/alumina washcoat. Following impregnation, the monolith is dried at 90° C. for 5 hours and then calcined at 550° C. for 5 hours. Exposure to a simulated exhaust gas stream shows that the comparative example NOx trap has improved $NO_x$ trapping efficiency over that of platinum alone.

We claim:

1. A nitrogen oxide trap useful for trapping nitrogen oxide present in an exhaust gas stream generated during lean-burn operation of an internal combustion engine and releasing said absorbed nitrogen oxides when an exhaust gas's oxygen concentration is lowered, said trap comprising:

a porous support loaded with 6–15 wt. % strontium oxide; and loaded thereon together:

(a) 0.5–5 wt. % precious metal selected from platinum, palladium, rhodium and mixtures thereof;

(b) 3.5–15 wt. % zirconium; and (c) 15–30 wt. % sulfate, each wt % being individually based on the weight of the support.

2. The nitrogen oxide trap according to claim 1 wherein said support comprises alumina.

3. The nitrogen oxide trap according to claim 2 wherein said alumina comprises at least 50% gamma-alumina.

4. The nitrogen oxide trap according to claim 1 wherein the weight ratio of zirconium to sulfate is about 1:1 to 1:7.

5. The nitrogen oxide trap according to claim 4 wherein the weight ratio of zirconium to sulfate is about 1:3.

6. An internal combustion engine exhaust gas catalyst system comprising a nitrogen oxide trap being arranged in the exhaust system and absorbing nitrogen oxides from exhaust gases when an air/fuel ratio of exhaust gas flowing into said trap is lean, said nitrogen oxide trap releasing absorbed nitrogen oxides when an exhaust gases' oxygen concentration is lowered, said nitrogen oxide trap comprising:

a porous support loaded with 6–15 wt. % strontium oxide and further loaded together thereon:

(a) 0.5–5 wt. % precious metal selected from platinum, palladium, rhodium and mixtures thereof;

(b) 3.5–15 wt. % zirconium; and, (c) 15–30 wt. % sulfate, each wt. % being individually based on the weight of the support.

7. The system according to claim 6 wherein the weight ratio of zirconium to sulfate is about 1:1 to 1:7.

8. The system according to claim 6 which further comprises a three way catalyst positioned upstream of the nitrogen oxide trap.

9. The system according to claim 6 which further comprises a three-way catalyst positioned downstream of the nitrogen oxide trap.

10. A process for making a NOx trap useful for absorbing nitrogen oxide present in an exhaust gas stream generated during lean-burn operation of an internal combustion engine and releasing the absorbed NOx when an exhaust gases' oxygen concentration is lowered, said process comprising the steps:

providing a porous support with a loading 6–15 wt. % strontium oxide;

loading onto said porous support/strontium oxide from a solution comprising a mixture of soluble precursors of: (a) 0.5–5 wt. % precious metal catalyst selected from platinum, palladium, rhodium or mixtures thereof; (b) 3.5–15 wt. % zirconium; and, (c) 15–30 wt. % sulfate, each wt. % being individually based on the weight of the support.

11. The process according to claim 10 wherein strontium oxide is provided on said support by impregnation from a soluble salt of strontium and subsequently calcination of the impregnated support in the presence of oxygen.

12. The process according to claim 10 wherein said (a), (b), and (c) are provided on said strontium oxide loaded support by impregnation from a solution of at least one of each of: (i) soluble acid or acid salt of said precious metal, (ii) soluble salt of zirconium; and (iii) sulfuric acid, soluble sulfate salts, or compounds containing sulfur and oxygen.

13. The process according to claim 10 wherein the weight ratio of zirconium to sulfate ranges from about 1:1 to 1:7.

* * * * *